US009178188B2

(12) United States Patent
Lim

(10) Patent No.: US 9,178,188 B2
(45) Date of Patent: Nov. 3, 2015

(54) RECHARGEABLE BATTERY WITH COLLECTOR PLATES HAVING INSULATORS AND CONDUCTORS

(75) Inventor: Wan-Mook Lim, Yongin-si (KR)

(73) Assignee: Samsung SDI Co., Ltd., Yongin (KR)

( * ) Notice: Subject to any disclaimer, the term of this patent is extended or adjusted under 35 U.S.C. 154(b) by 593 days.

(21) Appl. No.: 13/562,874

(22) Filed: Jul. 31, 2012

(65) Prior Publication Data

US 2013/0040178 A1 Feb. 14, 2013

(30) Foreign Application Priority Data

Aug. 8, 2011 (KR) .................. 10-2011-0078814

(51) Int. Cl.
| | |
|---|---|
| *H01M 2/24* | (2006.01) |
| *H01M 2/02* | (2006.01) |
| *H01M 2/04* | (2006.01) |
| *H01M 2/18* | (2006.01) |
| *H01M 2/26* | (2006.01) |
| *H01M 10/04* | (2006.01) |

(52) U.S. Cl.
CPC ............ *H01M 2/0242* (2013.01); *H01M 2/043* (2013.01); *H01M 2/18* (2013.01); *H01M 2/24* (2013.01); *H01M 2/263* (2013.01); *H01M 10/049* (2013.01); *Y10T 29/49108* (2015.01)

(58) Field of Classification Search
None
See application file for complete search history.

(56) References Cited

U.S. PATENT DOCUMENTS

| | | | |
|---|---|---|---|
| 2,287,802 A | 6/1942 | Hill | |
| 4,764,182 A | 8/1988 | Bish et al. | |
| 7,332,244 B2 | 2/2008 | Uemoto et al. | |
| 8,088,509 B2 | 1/2012 | Shen et al. | |
| 8,105,711 B2 | 1/2012 | Muraoka et al. | |
| 8,815,417 B2 | 8/2014 | Kim et al. | |
| 2008/0124617 A1* | 5/2008 | Bjork .............................. | 429/90 |

(Continued)

FOREIGN PATENT DOCUMENTS

| | | |
|---|---|---|
| CN | 1964126 A | 5/2007 |
| CN | 102214806 A | 10/2011 |

(Continued)

OTHER PUBLICATIONS

Extended European Search Report dated Nov. 6, 2012 for European Patent Application No. EP 12 178 619.8 which shares priority of Korean Patent Application No. KR 10-2011-0078814 with captioned U.S. Appl. No. 13/562,874.

(Continued)

*Primary Examiner* — Patrick Ryan
*Assistant Examiner* — Lucas J O'Donnell
(74) *Attorney, Agent, or Firm* — Knobbe Martens Olson & Bear LLP

(57) ABSTRACT

A rechargeable battery includes a plurality of electrode assemblies including positive and negative electrodes separated by a separator and a pair of electrode tabs protruding to both sides. A case receives the plurality of electrode assemblies. First and second current collecting plates cover openings formed on both sides of the case. First and second insulation plates are respectively disposed between the plurality of electrode assemblies and the first and second current collecting plates. The pair of electrode tabs at one side of the electrode assemblies pass through a first through hole formed in the first insulation plate and the pair of electrode tables at the other side of the electrode assemblies pass through a second through hole formed in the second insulation plate.

25 Claims, 8 Drawing Sheets

(56) References Cited

U.S. PATENT DOCUMENTS

| | | |
|---|---|---|
| 2008/0206628 A1 | 8/2008 | Honbou |
| 2009/0142658 A1 | 6/2009 | Shen et al. |
| 2010/0143773 A1 | 6/2010 | Honbou |
| 2010/0209749 A1 | 8/2010 | Okada |
| 2011/0076532 A1 | 3/2011 | Ha |
| 2011/0129701 A1 | 6/2011 | Seo |
| 2011/0129720 A1 | 6/2011 | Yun |
| 2011/0250488 A1* | 10/2011 | Park ............................ 429/163 |
| 2012/0094161 A1* | 4/2012 | Zheng ........................... 429/94 |

FOREIGN PATENT DOCUMENTS

| | | |
|---|---|---|
| EP | 2 378 590 A1 | 10/2011 |
| JP | 11-054153 A | 2/1999 |
| JP | H11-260330 A | 9/1999 |
| JP | U3073675 | 9/2000 |
| JP | 2001-229897 A | 8/2001 |
| JP | 2003-109655 A | 4/2003 |
| JP | 2003-323879 A | 11/2003 |
| JP | 2006-244755 A | 9/2006 |
| JP | 2008-135374 A | 6/2008 |
| JP | 2008-210729 A | 9/2008 |
| JP | 2010-135170 A | 6/2010 |
| JP | 2010-161044 A | 7/2010 |
| JP | 2011-060767 A | 3/2011 |
| JP | 2011-119216 A | 6/2011 |
| JP | 2011-222519 A | 11/2011 |
| KR | 10-2009-0028729 A | 3/2009 |
| KR | 10-2009-0051870 | 5/2009 |
| KR | 10-2011-0061315 A | 6/2011 |
| WO | WO 2007/121445 A2 | 10/2007 |
| WO | WO 2010/109001 A1 | 9/2010 |

OTHER PUBLICATIONS

Korean Office Action dated Oct. 31, 2012 for Korean Patent Application No. KR 10-2011-0078814 which corresponds to captioned U.S. Appl. No. 13/562,874.

Office Action dated Aug. 28, 2013 for corresponding EP Application No. 12 178 619.8-1359.

Office Action dated Apr. 29, 2013 for corresponding KR Application No. 10-2011-0078814.

Office Action issued on Jul. 24, 2015 in Chinese Patent Application No. 2012101599340.

* cited by examiner

RECHARGEABLE BATTERY WITH COLLECTOR PLATES HAVING INSULATORS AND CONDUCTORS

CROSS-REFERENCE TO RELATED APPLICATIONS

This application claims priority to and the benefit of Korean Patent Application No. 10-2011-0078814, filed in the Korean Intellectual Property Office on Aug. 8, 2011, the entire contents of which are incorporated herein by reference.

BACKGROUND

1. Field

Embodiments of the present disclosure relate generally to rechargeable batteries and, more particularly, to rechargeable batteries with high voltage and a large capacity.

2. Description of the Related Art

A rechargeable battery can be charged and discharged, unlike a primary battery. The rechargeable battery can repeatedly perform charge and discharge processes. In a charge process, electrical energy may be transformed into chemical energy and stored. In a discharge process, the stored chemical energy may be transformed into electrical energy.

Examples of rechargeable batteries may include nickel hydrogen batteries, nickel cadmium batteries, lithium ion batteries, lithium polymer batteries and so on. Rechargeable batteries having relatively low capacity may be used in small portable electronic devices, such as mobile phones, laptop computers, and camcorders. High capacity rechargeable batteries may be used to provide power for driving motors (e.g., motors of hybrid vehicles), storing electric power, and the like.

Particularly, hybrid vehicles and electric vehicles have been actively developed, so demands on the high-voltage rechargeable batteries and large-capacity rechargeable batteries have been recently increased.

Large electrode assemblies may be are manufactured so as to manufacture high-voltage rechargeable batteries and/or large-capacity rechargeable batteries. However, high-voltage rechargeable batteries and large-capacity rechargeable batteries commonly exhibit productivity deterioration compared to low-capacity rechargeable batteries because they are manufactured using a relatively complicated manufacturing process. Accordingly, development of high-voltage rechargeable batteries and large-capacity rechargeable batteries that can be configured with simple structures is desirable.

The above information disclosed in this Background section may be for enhancement of understanding of the background of the described technology and, therefore, it may contain information that does not form the prior art that may be already known to a person of ordinary skill in the art.

SUMMARY

The described technology has been made in an effort to provide a high-voltage rechargeable battery or a large-capacity rechargeable battery that can be configured with a simple structure.

An exemplary embodiment provides a rechargeable battery including: a plurality of electrode assemblies including a positive electrode, a negative electrode, and a separator provided between the positive electrode and the negative electrode, and a pair of electrode tabs protrude to both sides; a case for receiving the plurality of electrode assemblies; a first current collecting plate and a second current collecting plate for covering openings formed on both sides of the case; and a first insulation plate and a second insulation plate disposed between the plurality of electrode assemblies and the first current collecting plate and between the plurality of electrode assemblies and the second current collecting plate Each of the pair of the electrode tabs passes through a first through hole and a second through hole formed in the first insulation plate and the second insulation plate and is bent so the plurality of electrode assemblies are fixed in the first insulation plate and the second insulation plate.

The electrode tab includes a positive tab connected to the positive electrode and a negative tab connected to the negative electrode, at least one positive tab is electrically connected to the first current collecting plate, and at least one negative tab is electrically connected to the second current collecting plate.

The plurality of electrode assemblies are received so that electrode tabs with different polarities may neighbor each other, and the neighboring positive tab and negative tab are electrically connected so the plurality of electrode assemblies are electrically connected in series.

The plurality of electrode assemblies are received so that electrode tabs with the same polarity may neighbor each other, and the positive tab is electrically connected to the neighboring positive tab and the negative tab is electrically connected to the neighboring negative tab so a plurality of electrode assemblies are electrically connected in parallel.

Electrode tabs of a pair of neighboring electrode assemblies from among the plurality of electrode assemblies are bent in opposite directions.

Neighboring electrode tabs that are bent in the opposite directions form an overlapped area where they are overlapped and connected.

An electrode tab having no overlapped area from among the electrode tabs is electrically connected to the first current collecting plate or the second current collecting plate.

The first current collecting plate and the second current collecting plate include a first insulator and a second insulator that are protruded inside the case, and the overlapped area contacts a first insulator of the first current collecting plate or a second insulator of the second current collecting plate.

The electrode tab includes a positive tab connected to the positive electrode and a negative tab connected to the negative electrode, the first current collecting plate and the second current collecting plate further include a first conductor and a second conductor that are protruded inside the case, at least one of the positive tabs contacts the first conductor, and at least one of the negative tabs contacts the second conductor.

The electrode tabs of the plurality of electrode assemblies are bent in the same direction.

A plurality of insertion holes into which the plurality of electrode assemblies are inserted are formed in the case.

Each of the plurality of insertion holes has the same surface form as the plurality of electrode assemblies.

The second insulation plate is integrally formed with the case.

The case is formed with an insulating material.

Each of the plurality of electrode assemblies is formed in a jellyroll shape in which the positive electrode, the negative electrode, and the separator are spirally wound.

The first insulation plate or the second insulation plate is fixed to the first current collecting plate or the second current collecting plate to be integrally formed.

A groove is formed on both edges of the first insulation plate, a protrusion is formed to be protruded in a direction facing the first insulation plate on both edges of the first current collecting plate, and the protrusion is combined with the groove so the first insulation plate and the first current collecting plate are integrally fixed.

The first insulation plate is made of a polymer layer, the first current collecting plate is made of a metal layer, the metal layer and the polymer layer are adhered to each other to form a laminate, and a groove unit corresponding to the first through-hole of the first insulation plate is formed on the metal layer.

In another embodiment, method of making a rechargeable battery may be provided. The method may include providing a plurality of electrode assemblies that include a positive electrode, a negative electrode, and a separator provided between the positive electrode and the negative electrode. The method may further include a pair of electrode tabs that protrude from both sides of respective electrode assemblies of the plurality of electrode assemblies. The method may additionally include a case for receiving the plurality of electrode assemblies, where first and second openings are formed on first and second sides of the case. The method may also include a first current collecting plate and a second current collecting plate, where the first current collecting plate covers the first opening of the case and the second current collecting plate covers the second opening formed on the second side of the case. The method may further include a first insulation plate and a second insulation plate, where the first insulation plate includes a plurality of through holes and is disposed between the plurality of electrode assemblies and the first current collecting plate and where the second insulation plate includes a plurality of second through holes and is disposed between the plurality of electrode assemblies and the second current collecting plate In a further embodiment, the first electrode tab of each of the pair of the electrode tabs may pass through a first through hole and a second electrode tab of each of the pair of the electrode tabs may pass through a second through hole formed in the second insulation plate. Each of the pair of electrode tabs may be bent so that the plurality of electrode assemblies are fixed in the first insulation plate and the second insulation plate.

In other embodiments, the pair of electrode tabs may include a positive tab connected to the positive electrode and a negative tab connected to the negative electrode. At least one positive tab of the plurality of electrode assemblies may be electrically connected to the first current collecting plate and at least one negative tab of the plurality of electrode assemblies may be electrically connected to the second current collecting plate.

In an embodiment, the plurality of electrode assemblies may be received in the case so that electrode tabs with different polarities may neighbor each other. Neighboring positive tabs and negative tabs may be electrically connected so that the plurality of electrode assemblies are electrically connected in series.

In additional embodiments, the plurality of electrode assemblies may be received in the case so that electrode tabs with the same polarity may neighbor each other. Neighboring positive tabs may be electrically connected to each other and neighboring negative tabs may be electrically connected to each other. So configured, the plurality of electrode assemblies are electrically connected in parallel.

In certain embodiments, electrode tabs of a pair of neighboring electrode assemblies from among the plurality of electrode assemblies are bent in opposite directions.

In selected embodiments, neighboring electrode tabs that are bent in the opposite directions form an overlapped area where they are overlapped and connected to each other.

In other embodiments, an electrode tab having no overlapped area from among the electrode tabs may be electrically connected to one of the first current collecting plate and the second current collecting plate.

In additional embodiments, the first current collecting plate may include a first insulator and the second current collecting plate may include a second insulator. The first and second insulators may protrude inside the case. The overlapped area may contact one of the first insulator of the first current collecting plate and the second insulator of the second current collecting plate.

In an embodiment, the pair of electrode tabs may include a positive tab connected to the positive electrode and a negative tab connected to the negative electrode. The first current collecting plate may include a first conductor and the second current collecting plate may include a second conductor. The first and second conductors may protrude inside the case. At least one of the positive tabs may contact the first conductor and at least one of the negative tabs may contact the second conductor.

In other embodiments, the electrode tabs of the plurality of electrode assemblies are bent in the same direction.

In further embodiments, the case may further comprise a plurality of insertion holes configured to receive the plurality of electrode assemblies.

In alternative embodiments, each of the plurality of insertion holes may have the same cross-sectional shape as the plurality of electrode assemblies.

In additional embodiments, the second insulation plate may be integrally formed with the case.

In an embodiment, the case may be formed with an insulating material.

In further embodiments, each of the plurality of electrode assemblies may be formed in a jellyroll shape in which the positive electrode, the negative electrode, and the separator are spirally wound.

In additional embodiments, the first insulation plate and the second insulation plate may be configured such that either the first insulation plate is fixed to the first current collecting plate or the second insulation plate is fixed to the second current collecting plate In other embodiments, the first insulation plate may include a plurality of grooves formed on both edges. The first current collecting plate may include a plurality of protrusions formed on both edges in a direction facing the first insulation plate. At least a portion of the plurality of protrusions may be inserted into the plurality of grooves.

In alternative embodiments, the first insulation plate may comprise a polymer layer and the first current collecting plate may comprise a metal layer. A plurality of groove units corresponding to the plurality of first through holes of the first insulation plate may be formed on the metal layer. The metal layer and the polymer layer may be adhered to each other to form a laminate.

According to the embodiment, the high-voltage rechargeable battery or the large-capacity rechargeable battery is formed with a simple configuration to improve productivity of the rechargeable battery.

DETAILED DESCRIPTION

Figure 1:
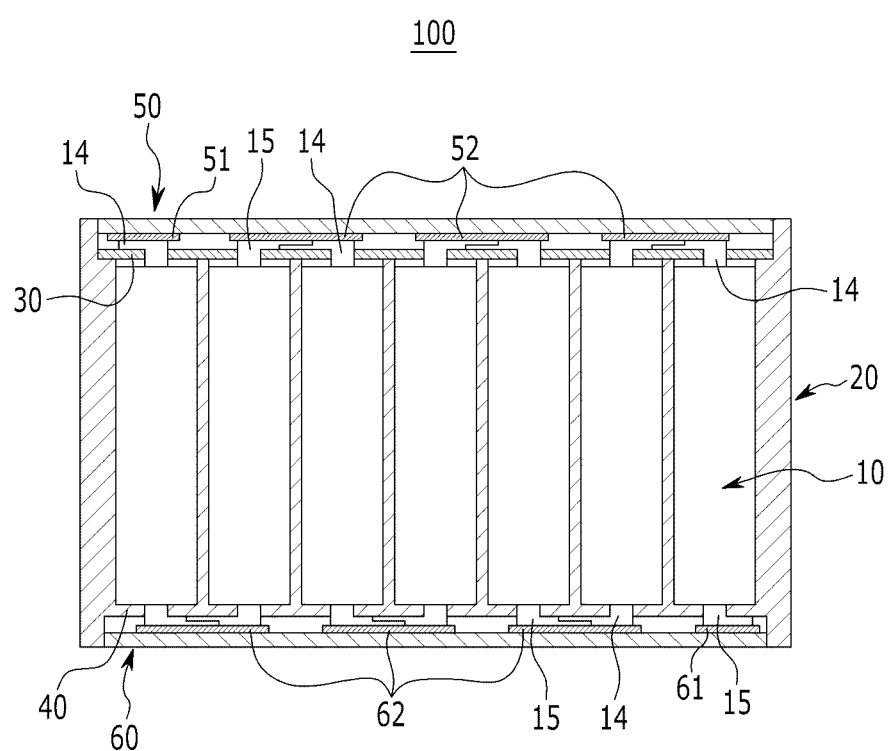
FIG. 1 shows a cross-sectional view of a rechargeable battery according to a first embodiment.

Embodiments of the present disclosure will be described more fully hereinafter with reference to the accompanying drawings, in which exemplary embodiments of the invention are shown.

In order to clarify a description of the disclosed embodiments, parts not related to the description are omitted, and the same reference numbers are used throughout the drawings to refer to the same or like parts. In addition, the size and thickness of each component shown in the drawings are arbitrarily shown for understanding and ease of description, but the present invention may be not limited thereto.

The terms "coupled" or "connected" as used herein have their ordinary meaning as known to those skilled in the art and may include, but are not limited to, mechanical connections, electrical connections, and combinations thereof. For example, in certain embodiments, when it may be described that a first element may be "coupled" or "connected" to a second element, the first element may be directly coupled or directly connected to the second element or electrically coupled or electrically connected to the second element through a third element.

Figure 2:
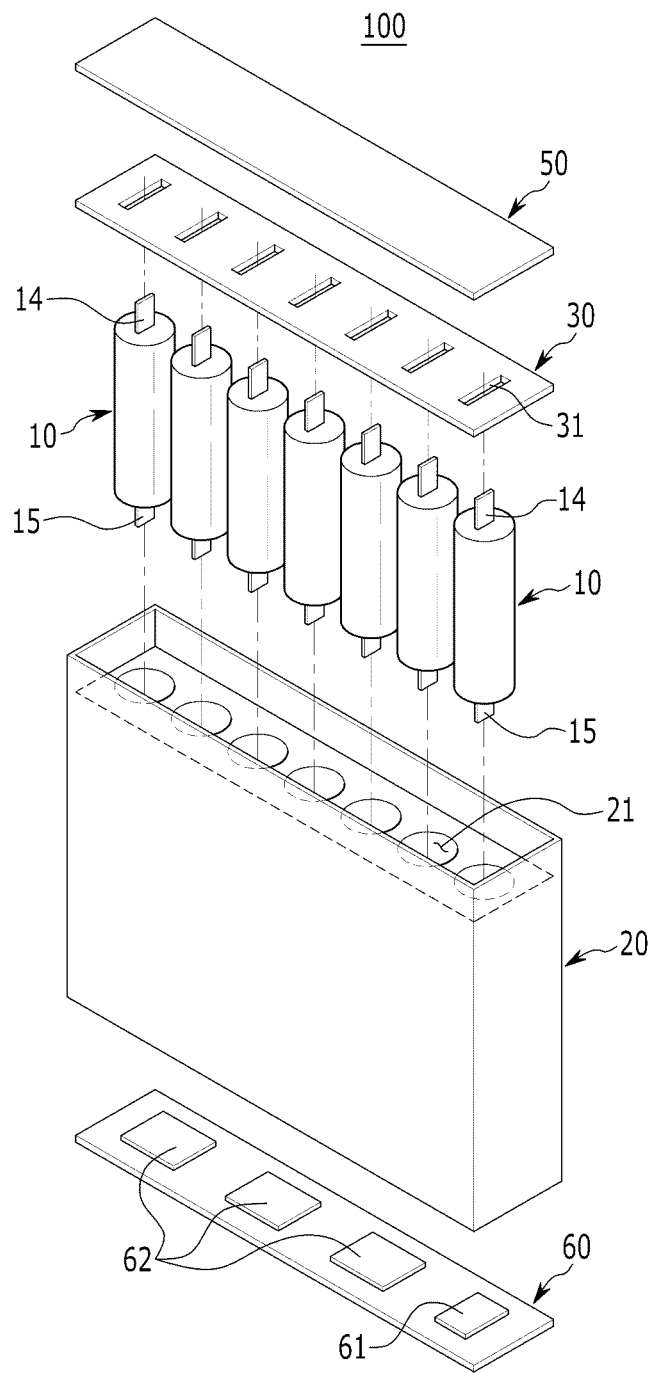
FIG. 2 shows an exploded perspective view of a rechargeable battery according to a first embodiment.

FIG. 1 shows a cross-sectional view of a rechargeable battery according to a first embodiment, and FIG. 2 shows an exploded perspective view of a rechargeable battery according to the first embodiment.

Referring to the embodiments of FIG. 1 and FIG. 2, the rechargeable battery 100 may include a plurality of electrode assemblies 10 and a case 20 configured to receive the plurality of electrode assemblies 10. The rechargeable battery 100 may further include current collecting plates 50 and 60, which may be electrically connected to the plurality of electrode assemblies 10 and insulation plates 30 and 40. The insulation plates 30 and 40 may be, respectively, disposed between the current collecting plates 50 and 60 and the plurality of electrode assemblies 10.

In the embodiment of FIG. 1 and FIG. 2, a jellyroll type of electrode assembly may be illustrated for the electrode assembly 10.

Figure 3:
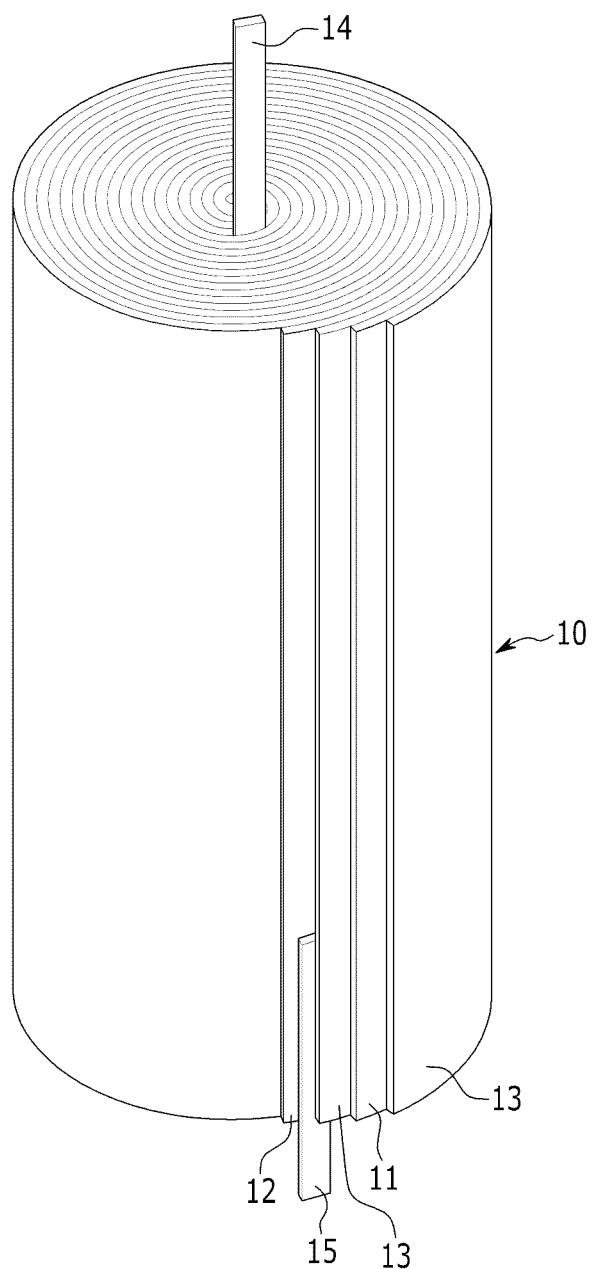
FIG. 3 shows a perspective view of an electrode assembly of a rechargeable battery according to a first embodiment.

FIG. 3 shows a perspective view of an electrode assembly 10 of the rechargeable battery 100 according to the first embodiment. The electrode assembly 10 according to the first embodiment will now be described with reference to FIG. 3.

Referring to FIG. 3, each electrode assembly within the plurality of electrode assemblies 10 may include a positive electrode 11, a negative electrode 12, and a separator 13 provided there between. An electrode assembly may be formed in a circular jellyroll shape by spirally winding the positive electrode 11 and the negative electrode 12.

Each electrode assembly within the plurality of electrode assemblies 10 may further include electrode tabs 14 and 15 that protrude from opposite ends of each electrode assembly. The electrode tabs 14 and 15 may include a positive tab 14 that may be electrically connected to the positive electrode 11 and a negative tab 15 that may be electrically connected to the negative electrode 12. In detail, the positive tab 14 and the negative tab 15 may be connected to a positive electrode uncoated region and a negative uncoated region respectively formed on the positive electrode 11 and the negative electrode 12.

The separator 13 provides a short circuit between the positive electrode 11 and the negative electrode 12 and insulates the electrode assembly 10 from the outside. An insulating tape can also be attached to a part where the positive electrode 11 and the negative electrode 12 are exposed outside the electrode assembly 10 so as to prevent the short circuit from the outside.

It may be understood that embodiments of the present disclosure may be are not limited to the illustrated electrode assembly, and the electrode assembly can be formed as a jellyroll in various forms in addition to the circular shape.

With further reference to FIG. 1 and FIG. 2, a plurality of insertion holes 21 into which the plurality of electrode assemblies 10 may be inserted may be formed inside the case 20. Each insertion hole 21 can have the same cross-sectional shape as the plurality of electrode assemblies 10. In this manner, the insertion holes 21 may be configured to receive the electrode assembly 10. For example, in the first embodiment of FIGS. 1, 2, and 3, circular jellyroll type of electrode assembly 10 may be used, the insertion holes 21 can be formed to be cylindrical hollows.

The case 20 can be formed with an electrically insulating material. For example, the case 20 can be formed with insulating resins including, but not limited to, polyethylene (PE), polypropylene (PP), and polyethylene terephthalate (PET).

In the first embodiment, in order to electrically couple the plurality of electrode assemblies 10 in series, the polarities of the electrode tabs 14 and 15 of the neighboring electrode assemblies 10 may be differently disposed. For example, when the positive tab 14 and the negative tab 15 are formed on an upper part and a lower part of the electrode assembly 10, respectively, the negative tab 15 and the positive tab 14 may also be formed on an upper part and a lower part of their neighboring electrode assembly 10. In this manner, the positive tabs 14 and the negative tabs 15 are alternately disposed in the direction in which the electrode assembly 10 may be disposed. Therefore, the positive tab 14 and the negative tab 15 of electrode assemblies 10 neighboring each other may be electrically connected so that the plurality of electrode assemblies 10 are electrically connected in series.

Openings may be formed on both sides of the case 20 so as to receive the plurality of electrode assemblies 10 into the case 20. The first current collecting plate 50 and the second current collecting plate 60 may, respectively, cover the openings 21 of the case 20 into which the electrode assemblies 10 are received.

The first current collecting plate 50 and the second current collecting plate 60 may close and seal the inside of the case 20, and The first and second current collecting plates 50 and 60 may also be electrically connected to the positive electrode 11 and the negative electrode 12 of the electrode assembly 10, respectively, to function as a positive terminal and a negative terminal for connecting a current generated by the electrode assembly 10 to an external device. In certain embodiments, for this purpose, the first current collecting plate 50 and the second current collecting plate 60 can be made of a metal such as aluminum or copper.

A first conductor 51 and a first insulator 52 that protrude inside the case 20 may be formed in the first current collecting plate 50. A second conductor 61 and a second insulator 62 that protrude inside the case 20 may be formed in the second current collecting plate 60. As a result, the positive electrode 11 may be electrically connected to the first current collecting plate 50 through contact of the first conductor 51 and the positive tab 14, and the negative electrode 12 may be electrically connected to the second current collecting plate 60 through contact of the second conductor 61 and the negative tab 15. A detailed description of the connection state between the electrode tabs 14 and 15 and the current collecting plates 50 and 60 may be described later below.

The first current collecting plate 50 may be connected to the positive electrode 11 and the second current collecting plate 60 may be connected to the negative electrode 12 in the present exemplary embodiment. In alternative embodiments, the first current collecting plate 50 can be connected to the negative electrode 12 and the second current collecting plate 60 can be connected to the positive electrode 11.

The first insulation plate 30 may be disposed between the first current collecting plate 50 and the plurality of electrode assemblies 10. The second insulation plate 40 may be disposed between the second current collecting plate 60 and the plurality of electrode assemblies 10.

A first through hole 31 and a second through hole 41 may be formed in the first insulation plate 30 and the second insulation plate 40 so that the electrode tabs 14 and 15 of the electrode assembly 10 that are received into the case 20 may be connected to the outside. The electrode tabs 14 and 15 of the electrode assembly 10 may also be bent after penetrating the through holes 31 and 41 of the insulation plates 30 and 40.

The electrode assembly 10 can be fixed to the insulation plates 30 and 40 according to embodiments of the above-noted configuration, and the neighboring electrode assembly 10 can be connected without an additional bonding process between the electrode tabs 14 and 15, as described in greater detail below.

The through holes 31 and 41 of the insulation plates 30 and 40 may allow the electrode tabs 14 and 15 to pass there through and fix the electrode assembly 10. The shape and the size of the through holes 31 and 41 may also be controlled so they can function as electrolyte injection openings for injecting an electrolyte solution into the case 20 in which the electrode assembly 10 is received. Accordingly, there may be no need to form an additional electrolyte injection opening in the rechargeable battery 100.

In certain embodiments, the first insulation plate 30 and the second insulation plate 40 can be formed with the same insulation material as the case 20.

The first insulation plate 30 may be independently formed from the case 20 so it can be bonded with the inner part of the case 20 when the electrode assembly 10 is received into the case 20. In detail, the first insulation plate 30 and the case 20 can be bonded together by applying an adhesive at about the point of contact between the first insulation plate 30 and the case 20 after disposing the first insulation plate 30. In addition, the first insulation plate 30 and the case 20 can be bonded by forming a groove in the case 20, forming a protrusion in the first insulation plate 30, and thus inserting the protrusion of the first insulation plate 30 into the groove of the case 20.

In certain embodiments, the second insulation plate 40 can be integrally formed with the case 20. The electrode assembly 10 can be received into one side of the case 20 in which the first insulation plate 30 is disposed so that the second insulation plate 40 can be integrally formed while the case 20 is formed. Accordingly, the process for manufacturing embodiments of the rechargeable battery 100 can be simplified by not forming the second insulation plate 40 and bonding it to the case 20 in the same manner as the first insulation plate 40.

However, in alternative embodiments, depending on the process, it may be possible to separately form the second insulation plate 40 and bond it to the case 20 in a like manner of the first insulation plate 30.

The first current collecting plate 50 and the second current collecting plate 60 can be combined with the case 20 so as to cover the opening of the case 20 when the electrode assembly 10 may be received and the first insulation plate 30 may be bonded to the case 20. In this instance, the combination of the first and second current collecting plates 50 and 60 with the case 20 can also be performed by using the adhesive as described above for the first insulation plate 30 or by mechanical combination as described above for the second insulation plate 40.

In certain embodiments, the electrolyte solution is injected into the case 20 while the current collecting plates 50 and 60 are bonded to the case 20. Accordingly, the second current collecting plate 60 may be bonded to the case 20, the electrolyte solution may be injected into the case 20, and the first current collecting plate 50 may be bonded to the case 20.

Hereinafter, referring to FIG. 4A to FIG. 5, a connection structure of an electrode tab and a current collecting plate of a rechargeable battery according to the first embodiment of the rechargeable battery 100 will be described in detail.

Figure 4A:
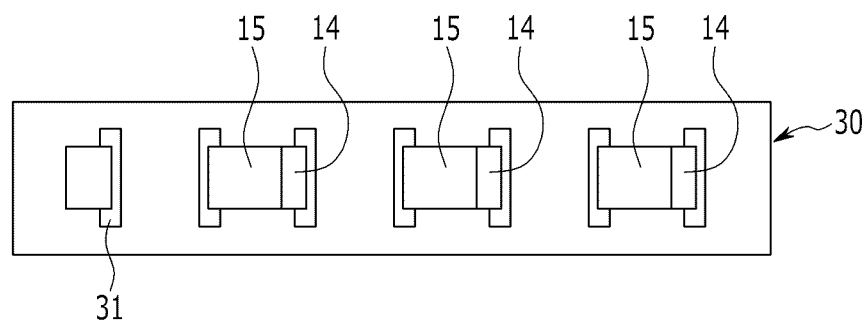
FIG. 4A and FIG. 4B show that electrode tabs of a rechargeable battery according to a first embodiment are connected.
Figure 4B:
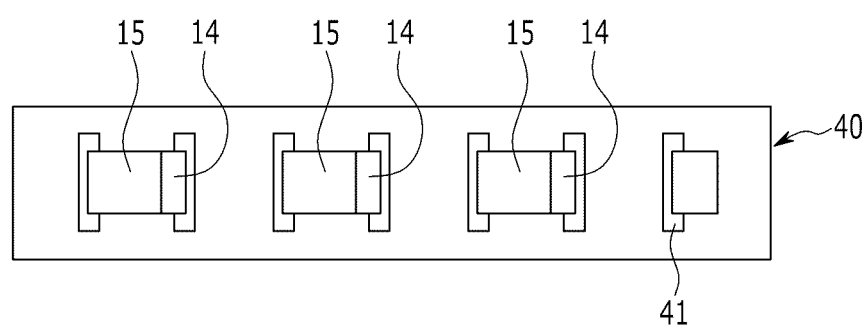

FIG. 4A and FIG. 4B show electrode tabs 14 and 15 of the rechargeable battery 100 according to the first embodiment in a connected state. These electrode tabs 14 and 15 may be connected with respect to an upper part of the first insulation plate 30 (FIG. 4A) and a lower part of the second insulation plate (FIG. 4B). FIG. 5 shows a perspective view the electrode tabs 14 and 15 of the rechargeable battery 100 in a connected state of according to a first exemplary embodiment and the current collecting plate 50.

Referring to FIG. 4A and FIG. 4B, the electrode tabs 14 and 15 of the electrode assembly 10 are passed through the first through hole 31 and the second through hole 41 so as to protrude outside the first insulation plate 30 and the second insulation plate 40. The protruding portions of the electrode tabs 14 and 15 may be bent.

With further reference to FIG. 4A and FIG. 4B, the six electrode tabs 14 and 15 on the right side of respective pairs of electrode assemblies 10, from the viewpoint of an upper part of the case 20, may be bent towards the center of their respective electrode assembly 10 pair. In this manner, the positive tab 14 and the negative tab 15 may be overlapped to form an overlapped area. Similarly, the six electrode tabs 14 and 15 on the left side of respective pairs of electrode assemblies 10, from the viewpoint of a lower part of the case 20, may also be bent towards the center of their respective electrode assembly 10 pair. In this manner, the positive tab 14 and the negative tab 15 may also be overlapped to form an overlapped area.

In certain embodiments, the directions that neighboring electrode tabs 14 and 15 are bent may be opposite to each other. Also, the directions which the positive tab 14 and the negative tab 15 in a single electrode assembly are bent may be opposite to each other.

Figure 5:
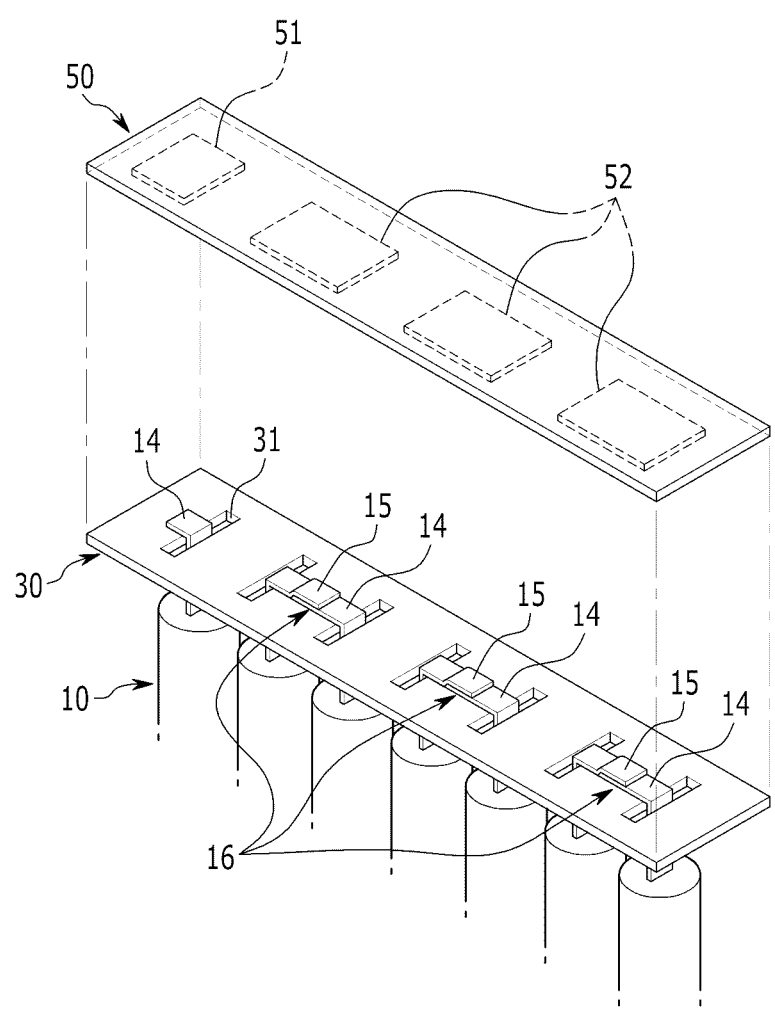
FIG. 5 shows a perspective view of a connected state of electrode tabs of a rechargeable battery according to a first embodiment and a current collecting plate.

FIG. 5 shows a connected state of the electrode tabs 14 and 15 and the current collecting plate 50 from the viewpoint of the upper part of the case 20. Given the correspondence between this configuration and that of the electrode tabs 14 and 15 and the current collecting plate 60 in the connected state at the lower part of the case 20, the connected state at the lower part of the case 20 will only be briefly described.

Referring to FIG. 5, the electrode tabs 14 and 15 are inserted into the first through hole 31 of the first insulation plate 30 and are then bent. The electrode tabs 14 and 15 of neighboring electrode assemblies 10 are bent in opposite directions so that the positive tab 14 and the negative tab 15 are formed to be a pair and overlapped to form an overlapped area 16. The negative tab 15 may be overlapped on the positive tab 14 in the first embodiment of the rechargeable battery 10. Alternatively, it may be sufficient for the neighboring electrode tabs 14 and 15 to be overlapped to contact each other so the positive tab 14 can be overlapped on the negative tab 15.

When the positive tab 14 and the negative tab 15 are formed to be a pair to form the overlapped area 16 as described, the first current collecting plate 50 may be combined with the opening of the case and may be disposed on the upper part of the first insulation plate 30.

A first conductor 51 and one or more first insulators 52 may protrude toward the inside of the case 20 may be formed in the first current collecting plate 50. The first conductor 51 may be formed corresponding to a position of the positive tab 14 that is not part of a pair of electrode assemblies 10 (e.g., at about an end of the rechargeable battery 100. The first insulator 52 may be formed corresponding to a position where respective positive tabs 14 and the negative tabs 15 are paired and form a plurality of overlapped areas 16.

Accordingly, the first current collecting plate 50 may be combined with the opening of the case 20 and the first conductor 51 may contact the positive tab 14 to electrically connect the first current collecting plate 50 to the positive electrode of the electrode assembly 10. The first insulators 52 may inhibit the neighboring positive tabs 14 and negative tabs 15 forming the respective connected overlapped areas 16 from contacting the first current collecting plate 50 and generating a short circuit. Further, the plurality of first insulators 52 may exert pressure upon the overlapped areas 16 while the first current collecting plate 50 is combined with the opening of the case 20 to inhibit the neighboring pairs of positive tabs 14 and the negative tabs 15 forming the overlapped areas 16 from becoming disconnected from one another.

A combination between the electrode tabs 14 and 15 and the second current collecting plate 60 may be performed in a like manner. That may be, the second current collecting plate 60 may include a second conductor 61 and a plurality of second insulators 62 formed inside the case 20, as illustrated in FIG. 3. The second current collecting plate 60 may be combined to the opening in the lower portion of the case 60 and the second conductor 60 may contact the negative tab 15 that is not part of a pair of electrode assemblies 10. The plurality of second insulators 62 may inhibit the neighboring positive tabs 14 and negative tabs 15 forming the respective connected overlapped areas from contacting the contacting the second current collecting plate 60 and generating a short circuit. The plurality of second insulators 62 may exert pressure upon the overlapped areas while the second current collecting plate 60 may be combined with the opening of the case 20 to control the disconnection of the neighboring positive tab 14 and the negative tab 15.

By connecting neighboring electrode assemblies 10, a plurality of electrode assemblies 10 can be coupled in series to form the high-voltage rechargeable battery 100.

Also, while the electrode assemblies 10 are coupled in series, the processes for bonding the electrode tabs 14 and 15 together, such as welding may be reduced or substantially omitted from the process for manufacturing embodiments of the rechargeable battery 100. In this manner, the process for manufacturing the high voltage rechargeable battery 100 may be simplified and the productivity of the rechargeable battery 100 may be improved.

In the above discussed embodiment of the rechargeable battery 100, the rechargeable battery 100 is indicated as including seven electrode assemblies 10. However, it may be understood that the number of the electrode assemblies 100 included in embodiments of the rechargeable battery 100 may be varied, as necessary. For example, the number of electrode assemblies 10 may be selected so as to provide an output voltage appropriate for usage or purpose of the rechargeable battery 100.

Figure 6:
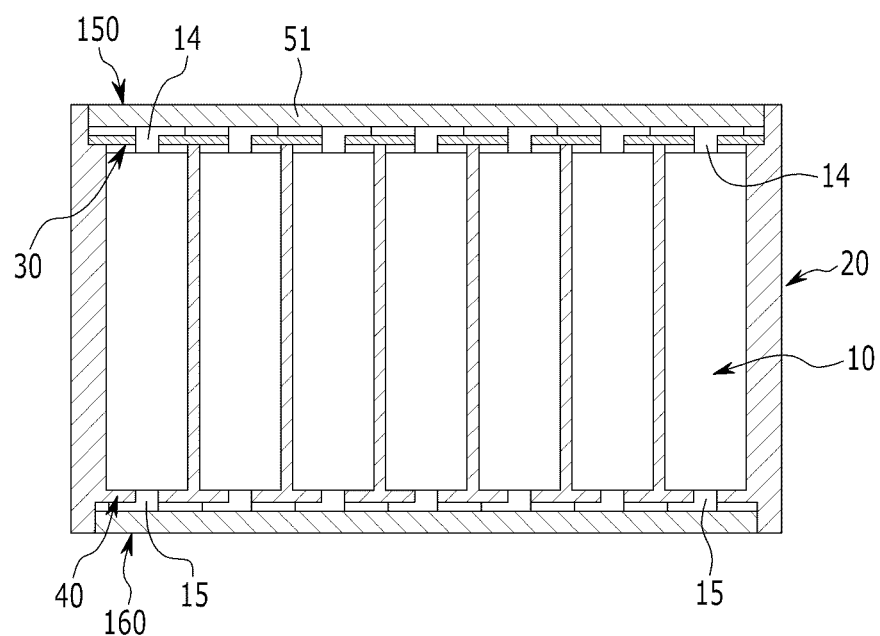
FIG. 6 shows a cross-sectional view of a rechargeable battery according to a second embodiment.

FIG. 6 shows a cross-sectional view of a rechargeable battery 101 according to a second embodiment. A configuration of the rechargeable battery 101 according to the second embodiment will now be described with reference to FIG. 3. As described in greater detail below, the second embodiment of the rechargeable battery 101 modifies the configuration of the electrode assemblies 10 with respect to the first embodiment of the rechargeable battery 100 so that the electrode assemblies 10 are configured in parallel. In the discussing the second embodiment of the rechargeable battery 101, elements having the same or similar configurations as found in the first embodiment of the rechargeable battery 100 will be briefly described or omitted.

The rechargeable battery 101 may include a plurality of electrode assemblies 10 and a case 20. Also, the rechargeable battery 101 may include current collecting plates 150 and 160. The current collecting plates 150 and 160 may be electrically connected to the electrode assembly 10 and insulation plates 30 and 40. The insulation plates 30 and 40 may be disposed between the current collecting plates 150 and 160 and the electrode assembly 10.

The electrode assemblies 10 may be formed in a jellyroll shape and may be received in a plurality of corresponding insertion holes 21 formed inside the case 20.

In order to couple a plurality of the electrode assemblies 10 in parallel to form the second embodiment of the rechargeable battery 101, the electrode assemblies 10 may be received and disposed so that electrode tabs 14 and 15 with the same polarity neighbor each other. For example, referring to FIG. 6, the positive tabs 14 of respective electrode assemblies 10 may be disposed on an upper side of the case 20 and the negative tabs 15 of the respective electrode assemblies 10 may be disposed on a lower side of the case 20. Therefore, the positive tabs 14 of neighboring electrode assemblies 10 may be electrically connected to one another. Similarly, the negative tabs 15 of neighboring electrode assemblies 10 may be electrically connected to one another. In this manner, the plurality of electrode assemblies 10 may be electrically connected in parallel.

The insulation plates 30 and 40 may be disposed to cover both sides of the electrode assembly 10. The positive tabs 14 of the electrode assembly 10 may be passed through the first plurality of through holes 31 of the first insulation plate 30 to protrude to an upper side of the case 20 and be bent. Likewise, the negative tabs 15 of the electrode assembly 10 may be passed through the second plurality of through holes 41 of the second insulation plate 40 to protrude to a lower side of the case 20 and be bent.

In the second embodiment of the rechargeable battery 101, the bending directions of the electrode tabs 14 and 15 are set to be the same and the neighboring electrode tabs 14 and 15 are not overlapped. However, it may be possible to overlap the neighboring electrode tabs 14 and 15 and form an overlapped area in a like manner of the first exemplary embodiment.

The first current collecting plate 150 and the second current collecting plate 160 may be combined with the case 20 to cover the openings that are respectively formed on the upper side and the lower side of the case 20. The first and second current collecting plates 150 and 160 may contact the positive tab 14 and the negative tab 15 that are passed through the first insulation plate 30 and the second insulation plate 40 and are bent.

Accordingly, the first current collecting plate 150 may be electrically connected to the positive electrode 11 of the electrode assembly 10, and the second current collecting plate 160 may be electrically connected to the negative electrode 12 of the electrode assembly 10. So configured, the first and second current collecting plates 150 and 160 may respectively function as a positive electrode terminal and a negative terminal.

Further, the first current collecting plate 150 and the second current collecting plate 160, when combined with the opening of the case 20, exert pressure on the positive tabs 14 and the negatives tab 15 to inhibit disconnection between the electrode assembly 10 and the current collecting plates 150 and 160.

The large-capacity rechargeable battery 101 may be formed by connecting the electrode assemblies 10 in parallel in the present embodiment.

Further, when the electrode assemblies 10 are coupled in parallel, additional bonding process, such as welding may be, reduced or substantially omitted from the process for manufacturing the second embodiment of the rechargeable battery 101. In this manner, the process for manufacturing the large-capacity rechargeable battery 101 may be simplified and the productivity of the rechargeable battery 101 may be improved.

The above-described embodiments have illustrated rechargeable battery configurations in which the first insulation plate 30 or the second insulation plate 40 is formed to be separated from the first current collecting plate 50 or the second current collecting plate 60. In alternative embodiments, the first insulation plate 30 can be fixed to or integrally formed with the first current collecting plate or the second insulation plate 40 can be respectively fixed to or integrally formed with the first current collecting plate 50 and the second current collecting plate 60.

A third embodiment of the rechargeable battery 102 in which a current collecting plate and an insulation plate are integrally formed will now be described with reference to FIG. 7 and FIG. 8.

Figure 7:
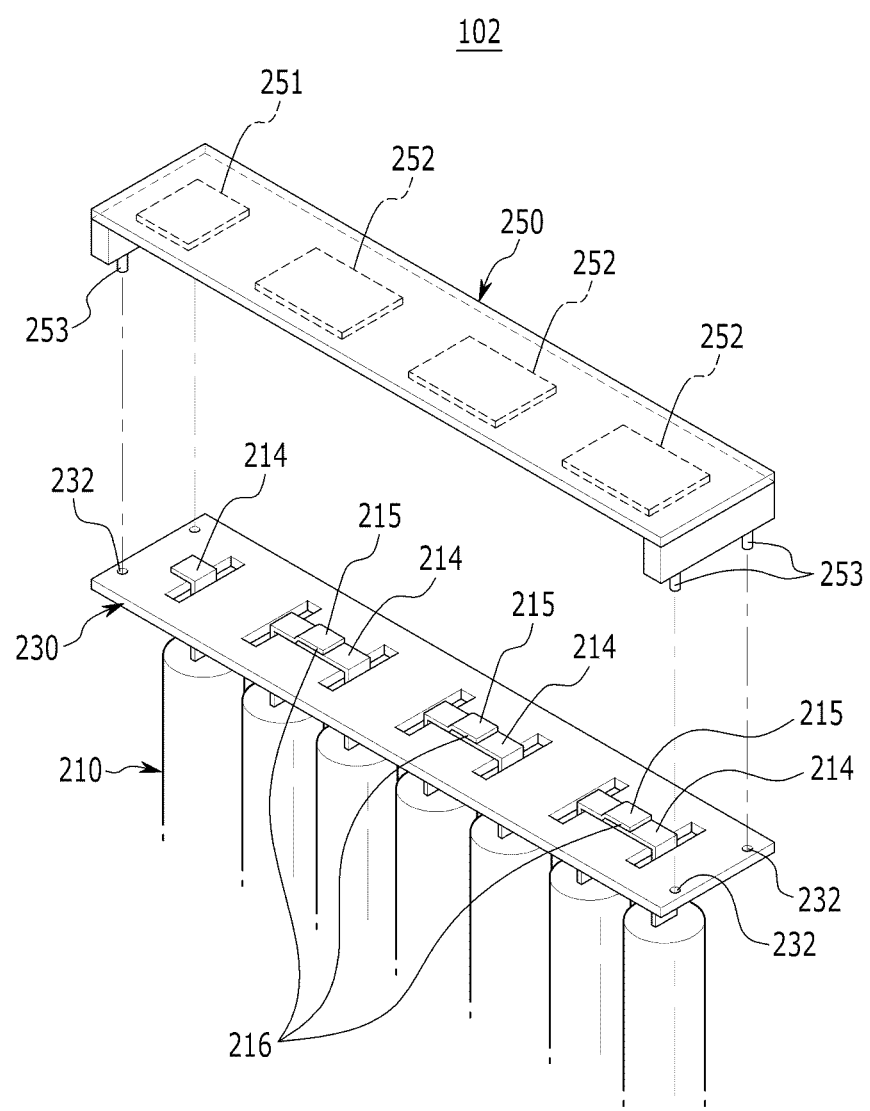
FIG. 7 shows a partial exploded perspective view of a rechargeable battery according to a third embodiment.

FIG. 7 shows a partial exploded perspective view of the rechargeable battery 102 according to the third exemplary embodiment. In describing the third embodiment of the rechargeable batter 102, components and configurations that are the same or similar to the first embodiment of the rechargeable battery 100 will be briefly described or omitted.

The rechargeable battery 102 may include a plurality of electrode assemblies 210 and a case (not shown) for receiving the electrode assemblies 210. Also, the rechargeable battery 102 may include a first current collecting plate 250 electrically connected to the electrode assembly 210 and a first insulation plate 230 disposed between the first current collecting plate 250 and the electrode assembly 210. A first conductor 251 and a first insulator 252 that protrude inside the case can be formed in the first current collecting plate 250.

In order to couple a plurality of electrode assemblies 210 in series in the present embodiment, the polarities of the electrode tabs 214 and 215 of the neighboring electrode assemblies 210 may be disposed to be different. That is, when a positive tab 214 and a negative tab 215 are formed on the upper part and the lower part of one of the electrode assemblies 210, a negative tab 215 and a positive tab 214 are formed on the upper part and the lower part of a neighboring electrode assembly 210. As such, the positive tabs 214 and the negative tabs 215 are alternately disposed in the direction in which the electrode assembly 210 is disposed. Therefore, the neighboring positive tabs 214 and negative tabs 215 may be electrically connected so a plurality of electrode assemblies 210 can be electrically connected in series. In the embodiment of FIG. 7, the positive tabs 214 and the negative tabs 215 of neighboring electrode assemblies 210 may be overlapped to form overlapped areas 216.

A plurality of protrusions 253 may be formed on both edges of the first current collecting plate 250 in the in a direction facing the first insulation plate 230. A plurality of grooves 232 may also be formed on both edges of the first insulation plate 230 so the protrusions 253 may be fixed to the grooves 232 (e.g., the protrusions 253 may be inserted in the grooves 232). In this manner, the first current collecting plate 250 and the first insulation plate 230 can be integrally formed.

Figure 8:
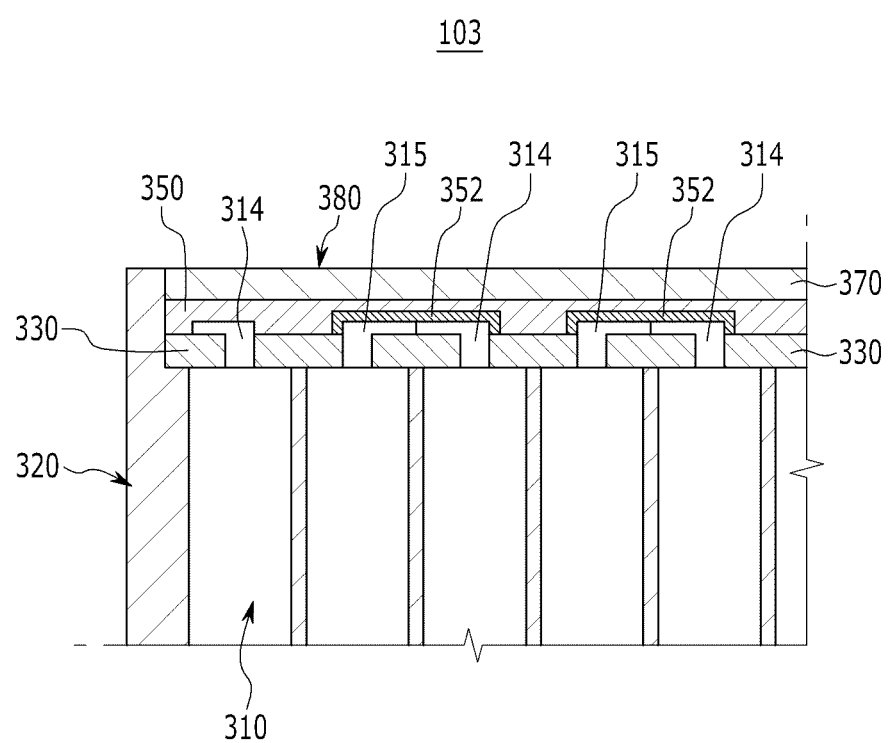
FIG. 8 shows a partial cross-sectional view of a rechargeable battery according to a fourth embodiment.

FIG. 8 shows a partial cross-sectional view of a rechargeable battery 103 according to a fourth embodiment. As described in greater detail below, the fourth embodiment of the rechargeable battery 103 illustrates an alternative configuration for integrally forming the current collecting plate and the insulation plate. In describing the fourth embodiment of the rechargeable battery 103, components and configurations that are the same or similar to the first exemplary embodiment will be briefly described or omitted.

The rechargeable battery 103 may include a plurality of electrode assemblies 310 and a case 320 for receiving the electrode assemblies 310. A current collecting plate and the insulation plate can be fixed with a laminate 380 and can be integrally formed.

The laminate 380 may be configured with a metal layer 350 (i.e., a current collecting plate) and a first polymer layer 370 and a second polymer layer 330 (i.e., an insulation plate) bonded on both surfaces of the metal layer 350. The metal layer 350 can be made of metals including, but not limited to, aluminum, stainless steel, and clad metal bonded with aluminum and copper. In this manner, the metal layer 350 can function as a current collecting plate and the second polymer layer 330 can function as an insulation plate.

A plurality of groove units may be formed on the lower part of the metal layer 350 and the first insulator 352 may be bonded to the inside of the groove units. The first insulator 352 may be formed to have the groove shape and receive the positive tabs 314 and the negative tabs 315. A plurality of through-holes may be formed in the second polymer layer 330 to allow the positive tabs 314 and the negative tabs 315 to penetrate the through-holes.

The above-noted laminate 380 can be manufactured by using injection molding processes and can be respectively formed on the upper part and the lower part of the electrode assembly 310.

Although the foregoing description has shown, described, and pointed out the fundamental novel features of the present teachings, it will be understood that various omissions, substitutions, changes, and/or additions in the form of the detail of the apparatus as illustrated, as well as the uses thereof, may be made by those skilled in the art, without departing from the scope of the present teachings. Consequently, the scope of the present teachings should not be limited to the foregoing discussion, but should be defined by the appended claims.

What is claimed is:
1. A rechargeable battery comprising:
a plurality of electrode assemblies including
a positive electrode,
a negative electrode, and
a separator provided between the positive electrode and the negative electrode, and a pair of electrode tabs protrude to both sides wherein the pair of electrode tabs comprises a positive electrode tab connected to the positive electrode and a negative electrode tab connected to the negative electrode;

a case for receiving the plurality of electrode assemblies;

a first current collecting plate which comprises a positive current collecting plate and a second current collecting plate which comprises a negative current collecting plate formed on both sides of the case, wherein the first current collecting plate and the second current collecting plate include a first insulator and a second insulator that are protruded inside the case, and a first conductor and a second conductor that are protruded inside the case; and a first insulation plate and a second insulation plate disposed between the plurality of electrode assemblies and the first current collecting plate and between the plurality of electrode assemblies and the second current collecting plate, wherein each of the pair of the electrode tabs passes through a first through hole and a second through hole formed in the first insulation plate and the second insulation plate, and wherein electrode tabs of a pair of neighboring electrode assemblies from among the plurality of electrode assemblies are bent in opposite directions to form an overlapped area where they are overlapped and connected, the overlapped area contacting the first insulator of the first current collecting plate or the second insulator of the second current collecting plate, and wherein at least one of the positive electrode tabs contacts the first conductor, and at least one of the negative electrode tabs contacts the second conductor.

2. The rechargeable battery of claim 1, wherein
the each of the pair of the electrode tabs is bent so the plurality of electrode assemblies are fixed in the first insulation plate and the second insulation plate.

3. The rechargeable battery of claim 1, wherein
the plurality of electrode assemblies are received so that electrode tabs with different polarities may neighbor each other, and
the neighboring positive tab and negative tab are electrically connected so the plurality of electrode assemblies are electrically connected in series.

4. The rechargeable battery of claim 1, wherein
the plurality of electrode assemblies are received so that electrode tabs with the same polarity may neighbor each other, and
the positive tab is electrically connected to the neighboring positive tab and the negative tab is electrically connected to the neighboring negative tab so a plurality of electrode assemblies are electrically connected in parallel.

5. The rechargeable battery of claim 1, wherein an electrode tab having no overlapped area from among the electrode tabs is electrically connected to the first current collecting plate or the second current collecting plate.

6. The rechargeable battery of claim 1, wherein a plurality of insertion holes into which the plurality of electrode assemblies are inserted are formed in the case.

7. The rechargeable battery of claim 6, wherein each of the plurality of insertion holes has the same surface form as the plurality of electrode assemblies.

8. The rechargeable battery of claim 1, wherein the second insulation plate is integrally formed with the case.

9. The rechargeable battery of claim 1, wherein the case is formed with an insulating material.

10. The rechargeable battery of claim 1, wherein each of the plurality of electrode assemblies is formed in a jellyroll shape in which the positive electrode, the negative electrode, and the separator are spirally wound.

11. The rechargeable battery of claim 1, wherein the first insulation plate or the second insulation plate is fixed to the first current collecting plate or the second current collecting plate to be integrally formed.

12. The rechargeable battery of claim 11, wherein
a groove is formed on both edges of the first insulation plate,
a protrusion is formed to be protruded in a direction facing the first insulation plate on both edges of the first current collecting plate, and
the protrusion is combined with the groove so the first insulation plate and the first current collecting plate are integrally fixed.

13. The rechargeable battery of claim 11, wherein
the first insulation plate is made of a polymer layer,
the first current collecting plate is made of a metal layer,
the metal layer and the polymer layer are adhered to each other to form a laminate, and a groove unit corresponding to the first through-hole of the first insulation plate is formed on the metal layer.

14. A method of fabricating a rechargeable battery, the method comprising:
providing a plurality of electrode assemblies, comprising a positive electrode, a negative electrode, a separator positioned between the positive and negative electrodes, and a pair of electrode tabs that protrude from both sides of respective electrode assemblies of the plurality of electrode assemblies, the pair of electrode tabs including positive tab connected to the positive electrode and a negative tab connected to the negative electrode;
positioning the plurality of electrode assemblies within a case configured to receive the plurality of electrode assemblies, wherein the case includes a first opening at a first end and a second opening at a second end;
covering the first opening of the case with a first current collecting plate which comprises a positive current collecting plate wherein the first collecting plate is in electrical communication with the positive electrode and includes a first insulator and a first conductor;
covering the second opening of the case with a second current collecting plate which comprises a negative current collecting plate wherein the second collecting plate is in electrical communication with the negative electrode and includes a second insulator and a second conductor, such that the first and second insulators protrude inside the case, the the first and second conductors protrude inside the case;
positioning a first insulation plate comprising a plurality of first through holes between the plurality of electrode assemblies and the first current collecting plate;
positioning a second insulation plate comprising a plurality of second through holes between the plurality of electrode assemblies and the second current collecting plate;
inserting a first electrode tab of each of the pair of the electrode tabs through the first plurality of through holes formed in the first insulation plate and a second electrode tab of each of the pair of the electrode tabs passes through the second plurality of through holes formed in the second insulation plate; and
bending each of the pair of electrode tabs so the plurality of electrode tabs are fixed in the first insulation plate and the second insulation plate, wherein electrode tabs of a pair of neighboring electrode assemblies from among the plurality of electrode assemblies are bent in opposite directions to form an overlapped area where they are overlapped and connected to each other, and wherein the overlapped area contacts one of the first insulator of the first current collecting plate and the second insulator of the second current collecting plate, and at least one of the positive tabs contacts the first conductor, and at least one of the negative tabs contacts the second conductor.

15. The method of claim 14, wherein:

the plurality of electrode assemblies are received in the case so that electrode tabs with different polarities neighbor each other, and neighboring positive tabs and negative tabs are electrically connected so the plurality of electrode assemblies are electrically connected in series.

16. The method of claim 14, wherein:

the plurality of electrode assemblies are received in the case so that electrode tabs with the same polarity neighbor each other, and neighboring positive tabs are electrically connected to each other and the neighboring negative tabs are electrically connected to each other so that the plurality of electrode assemblies are electrically connected in parallel.

17. The method of claim 14, wherein an electrode tab having no overlapped area from among the electrode tabs is electrically connected to one of the first current collecting plate and the second current collecting plate.

18. The method of claim 14, wherein the case further comprises a plurality of insertion holes configured to receive the plurality of electrode assemblies.

19. The method of claim 18, wherein each of the plurality of insertion holes has the same cross-sectional shape as the plurality of electrode assemblies.

20. The method of claim 14, wherein the second insulation plate is integrally formed with the case.

21. The method of claim 14, wherein the case is formed from an insulating material.

22. The method of claim 14, wherein each of the plurality of electrode assemblies is formed in a jellyroll shape in which the positive electrode, the negative electrode, and the separator are spirally wound.

23. The method of claim 14, wherein the first insulation plate and the second insulation plate are configured such that either the first insulation plate is fixed to the first current collecting plate or the second insulation plate is fixed to the second current collecting plate.

24. The method of claim 23, wherein:

the first insulation plate includes a plurality of grooves formed on both edges, the first current collecting plate includes a plurality of protrusions formed on both edges and oriented in a direction facing the first insulation plate, and at least a portion of the plurality of protrusions is inserted into the plurality of grooves.

25. The method of claim 23, wherein:

the first insulation plate comprises a polymer layer, the first current collecting plate comprises a metal layer, a plurality of groove units corresponding to the plurality of first through holes of the first insulation plate are formed on the metal layer, and the metal layer and the polymer layer are adhered to each other to form a laminate.

* * * * *